UNITED STATES PATENT OFFICE

JAMES BADDILEY, PERCY CHORLEY, AND RAINALD BRIGHTMAN, OF BLACKLEY, MANCHESTER, ENGLAND, ASSIGNORS TO BRITISH DYESTUFFS CORPORATION LIMITED, OF BLACKLEY, MANCHESTER, ENGLAND

NEW SECONDARY DISAZO DYES

No Drawing. Application filed May 21, 1927, Serial No. 193,376, and in Great Britain September 8, 1926.

In our invention new secondary disazo dyes are prepared by coupling diazotized aminoazo compounds, (including their homologues and the sulphonic or carboxylic acids thereof in this term) in alkaline or acid media, with 2-amino-8-naphthol sulphonic acids of the type

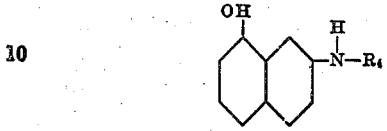

wherein $R_4$ represents alkyl or acyl group or a benzene or naphthalene residue, which are free from amino substituent. The dyestuffs produced by this method are characterized by the following general formula

wherein R represents a benzene or naphthalene residue which may or may not be further substituted and $R_3$ represents a coupled 2-amino-8-naphthol sulphonic acid of the type

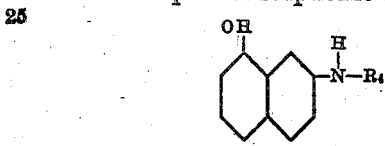

wherein $R_4$ represents an alkyl or acyl group or a benzene or naphthalene residue which are free from amino substituent. We have found that dyestuffs of this characteristic type generally possess the valuable property of dyeing regenerated silks, such as viscose silk, in even level shades.

The aminoazo compounds we use may be prepared by coupling any aromatic amines, their substitution products and sulphonic or carboxylic acids thereof with suitable middle components, or from unsubstituted aromatic aminoazo compounds by substitution in the known ways. For example, we may use aminoazobenzene sulphonic acid, or the compound obtained by coupling aniline with 1-naphthylamine-6- or 7-sulphonic acid, or the compound obtained by coupling 2-naphthylamine-4:8-disulphonic acid with 1-naphthylamine, and so forth.

The invention is illustrated by the following examples, which, it is understood, are by no means limitative; the parts being by weight:—

Example 1

343 parts of 2-meta-xylylamino-8-naphthol-6-sulphonic acid are dissolved in water with 500 parts of sodium carbonate. The solution is cooled and stirred and there is added the diazo suspension obtained in the usual way by diazotizing the amino-azo dyestuff prepared by coupling 93 parts of aniline with 223 parts of a technical mixture of α-naphthylamine-6- and 7-sulphonic acids according to known procedure. The mixture is maintained alkaline and stirred until coupling is complete, when it is heated up and the dyestuff isolated by the addition of salt. It dyes viscose silk a blue-black shade. The constitution of the dye so obtained is probably represented, in the form of its sodium salt, by the formula

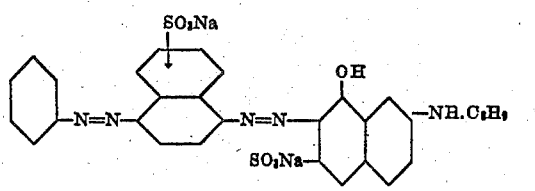

Example 2

The aminoazo compound obtained by diazotizing 173 parts of metanilic acid and combining with 143 parts of α-naphthylamine in the usual way is diazotized with 250 parts of 36 per cent hydrochloric acid and 69 parts of sodium nitrite and the suspension of diazo-compound is stirred into a solution of 337 parts of the sodium salt of 2-phenylamino-8-naphthol-6-sulphonic acid containing 370 parts of sodium carbonate. The mixture is maintained alkaline and stirred until coupling is complete, when it is heated up and the dyestuff precipitated with common salt. It dyes viscose silk a grey shade. The constitution of the dye so obtained is probably represented, in the form of its sodium salt, by the formula

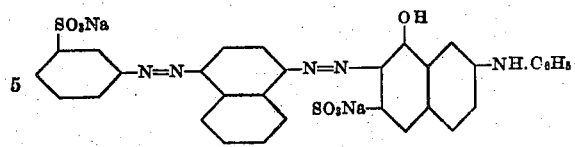

Example 3

153 parts of aminosalicylic acid obtained on reduction of the technical mixture of nitrosalicylic acids are diazotized and combined in the usual manner with 143 parts of α-naphthylamine. The resulting aminoazo compound is diazotized in the known manner with 69 parts of sodium nitrite and 250 parts of 36 per cent hydrochloric acid, and the suspension of diazo-compound is slowly stirred into a well-cooled solution of 2-benzoylamino-8-naphthol-6-sulphonic acid, containing sufficient sodium carbonate to keep the mixture faintly alkaline throughout. When combination is complete, the mixture is heated up and the dyestuff isolated by the addition of common salt. It gives a deep blue shade on viscose silk. The constitution of the dye so obtained is probably represented, in the form of its sodium salt, by the formula

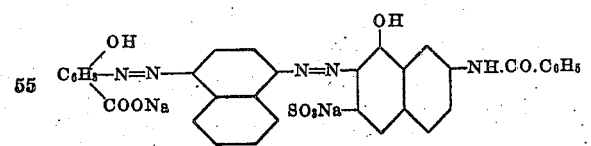

Example 4

277 parts of para-aminoazobenzene sulphonic acid are diazotized in the usual way with 250 parts of 36 per cent hydrochloric acid and 69 parts of sodium nitrite. The suspension of diazo-compound is stirred into a solution of 337 parts of the sodium salt of 2-phenylamino-8-naphthol-6-sulphonic acid. The mixture, which is acid to Congo red paper, is stirred until coupling is complete, when it is made alkaline, heated, and the dyestuff isolated by the addition of common salt. It dyes viscose silk a brown shade. If the coupling is performed in an alkaline medium, a different dyestuff is produced. This also dyes viscose silk a brown shade. The constitution of the dye so obtained is probably represented, in the form of its sodium salt, by the formula

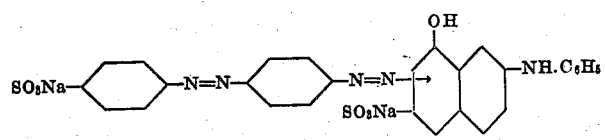

Our invention is further illustrated by the examples quoted in the following table:—

| Disazo colour from: | | Shade on viscose silk |
|---|---|---|
| Aminoazo compound diazotized | 2-amino-8-naphthol sulphonic acid | |
| m-xylidine sulphonic acid → m-amino-p-cresolmethyl ether | 2-phenylamino-8-napthol-6-sulphonic acid | Violet-black |
| Aminosalicylic acid→α-naphthylamine | 8-hydroxy-2-2'-dinaphthylamine-3:6-disulphonic acid | Blue-black |
| Aminosalicylic acid→α-naphthylamine | 2-phenylamino-8-naphthol-6-sulphonic acid | Black |
| Aminoazobenzene | 2-phenylamino-8-naphthol-6-sulphonic acid | Brown |
| p-aminoazobenzene-p'-carboxylic acid | 2-phenylamino-8-naphthol-6-sulphonic acid | Brown |
| p-aminoazobenzene-p'-sulphonic acid | 8-hydroxy-2-2'dinaphthylamino-6-sulphonic acid | Brown |
| p-aminoazobenzene-p'-sulphonic acid | 2-o-methoxyphenylamino-8-naphthol-6-sulphonic acid | Brown |
| p-aminoazobenzene-p'-sulphonic acid | 2-(2':4'-dinitro)phenylamino-8-naphthol-6-sulphonic acid | Red-brown |
| p-aminoazobenzene-p'-sulphonic acid | 2-ethylamino-8-naphthol-6-sulphonic acid | Olive-brown |
| p-aminoazobenzene-p'-sulphonic acid | 2-benzoylamino-8-naphthol-6-sulphonic acid | Brown |
| p-aminoazobenzene-p'-sulphonic acid | 2-acetylamino-8-naphthol-6-sulphonic acid | Red-brown |
| p-aminoazobenzene-p'-sulphonic acid | 8-hydroxy-2-naphthyl-glycine-6-sulphonic acid | Orange-brown |
| 2-naphthylamine-4: 8-disulphonic acid→αnaphthylamine | 2-phenylamino-8-naphthol-6-sulphonic acid | Navy-blue |
| Aniline→1-naphthylamine-6-sulphonic acid | 2-phenylamino-8-naphthol-6-sulphonic acid | Blue-black |

What we claim and desire to secure by Letters Patent is:—

1. As new secondary disazo dyes suitable for dyeing regenerated cellulose in even level shades, the dyestuffs having the formula

wherein R represents a benzene or naphthalene residue free from hydroxyl groups and $R_3$ represents a coupled 2-amino-8-naphthol sulphonic acid of the type

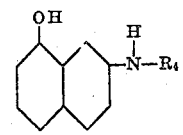

wherein $R_4$ represents alkyl or acyl group or benzene or naphthalene residue which are free from amino substituents, the said dyestuff dyeing regenerated cellulose in even level shades.

2. As new secondary disazo dyes suitable for dyeing regenerated cellulose in even level shades, the dyestuffs having the formula

in which R represents a benzene or naphthalene residue and $R_3$ represents a coupled 2-amino-8-naphthol sulphonic acid of the type

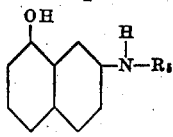

wherein $R_5$ represents alkyl group or benzene or naphthalene residue which are free from amino substituents, the said dyestuff dyeing regenerated cellulose in even level shades.

3. As new secondary disazo dyes suitable for dyeing regenerated cellulose in even level shades, the dyestuffs having the formula $$R_1-N=N-R-N=N-R_3$$

wherein $R_1$ represents a benzene residue free from hydroxyl groups, $R$ represents a benzene or naphthalene residue, and $R_3$ represents coupled 2-amino-8-naphthol sulphonic acid of the type

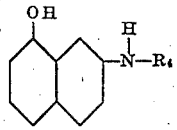

wherein $R_4$ represents alkyl or acyl group or benzene or naphthalene residue which are free from amino substituents, the said dyestuff dyeing regenerated cellulose in even level shades.

4. As new secondary disazo dyes suitable for dyeing regenerated cellulose in even level shades, the dyestuffs having the formula $$R_2-N=N-R-N=N-R_3$$

wherein $R_2$ represents a benzene residue containing a sulphonic or carboxylic group, $R$ represents a benzene or naphthalene residue and $R_3$ represents a 2-amino-8-naphthol sulphonic acid of the type

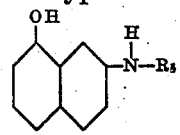

wherein $R_5$ represents alkyl group or benzene or naphthalene residue which are free from amino substituents and in which at least one sulphonic acid group is connected to the 2-amino-8-naphthol nucleus in the sixth position, the said dyestuff dyeing regenerated cellulose in even level shades.

5. As new secondary disazo dyes suitable for dyeing regenerated cellulose in even level shades, the dyestuffs having the formula

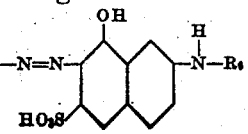

wherein $R$ represents a benzene or naphthalene residue and $R_6$ represents a benzene or naphthalene residue which is free from amino substituent, the said dyestuff dyeing regenerated cellulose in even level shades.

6. As a new secondary disazo dye suitable for dyeing regenerated cellulose in even level shade, a dyestuff having the probable formula

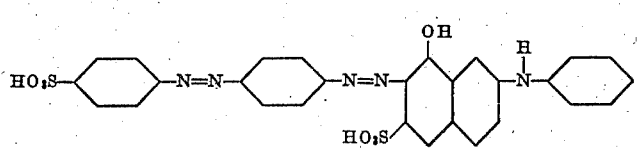

and being a black powder dissolving in water to give a dark brown solution; addition of dilute mineral acids to this solution producing a reddish shade with a deposition of a brown precipitate, addition of dilute caustic soda causing the solution to become greenish, the dyestuff dissolving in concentrated sulphuric acid to a bright greenish-blue solution yielding on dilution with water a brown para-phenylene-diamine sulphanilic acid and 7-amino-2-phenylamino-8-naphthol-6-sulphonic acid, the said dyestuff dyeing regenerated cellulose in even level brown shade.

In testimony whereof we affix our signatures.

JAMES BADDILEY.
PERCY CHORLEY.
RAINALD BRIGHTMAN.